Oct. 4, 1960     H. J. DRISCOLL     2,955,063
INSULATING BLANKET
Filed Dec. 4, 1956
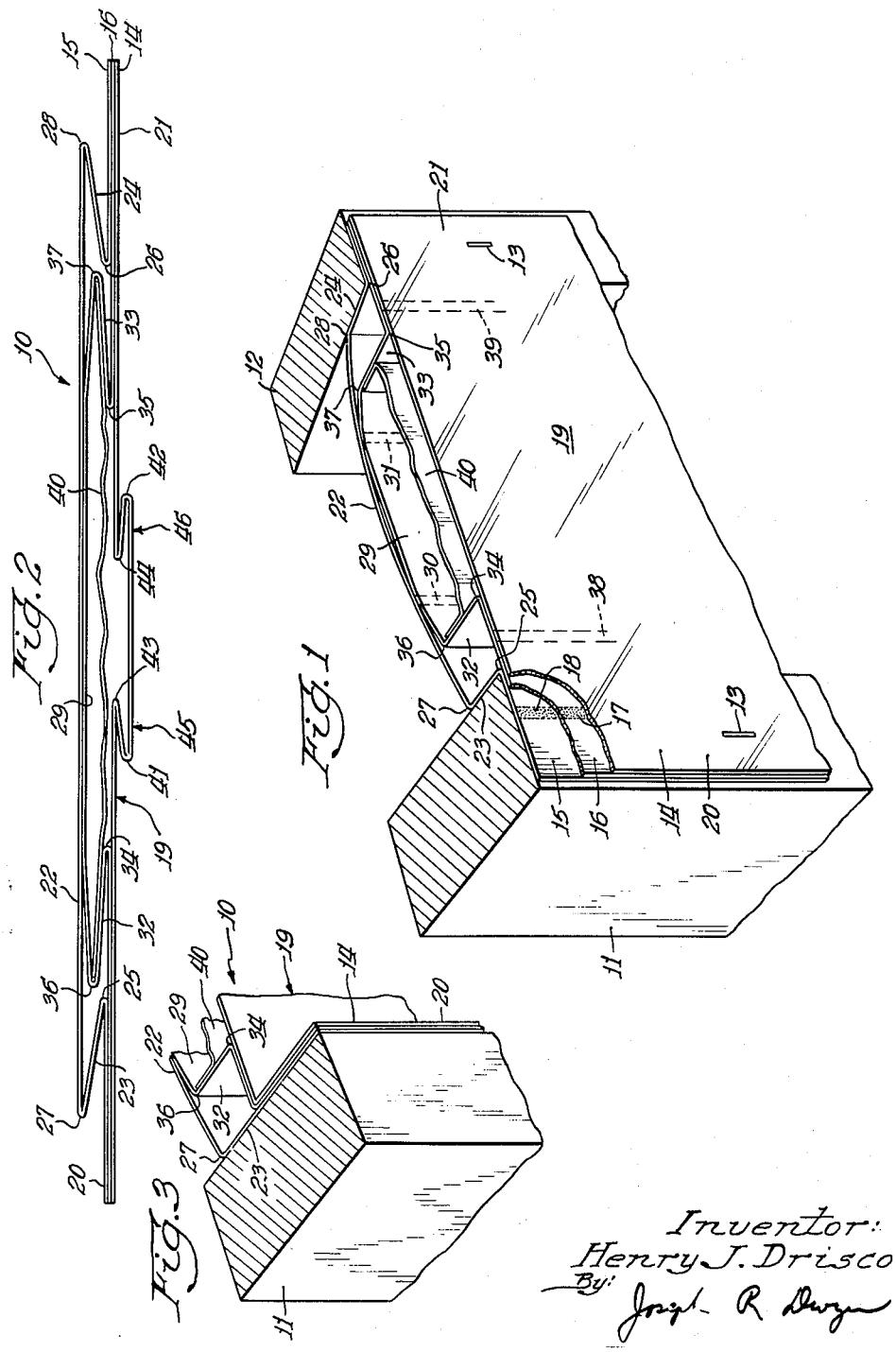
Inventor:
Henry J. Driscoll
By: Joseph R. Dwyer
Atty.

United States Patent Office 2,955,063
Patented Oct. 4, 1960

2,955,063

INSULATING BLANKET

Henry J. Driscoll, Hudson Falls, N.Y., assignor, by mesne assignments, to Reflectal Corporation, Chicago, Ill., a corporation of New York Filed Dec. 4, 1956, Ser. No. 626,169

6 Claims. (Cl. 154—45)

This application relates to thermal insulation and more particularly to light weight, expansible, foldable and rollable thermal insulation utilizing the reflective property of a bright metal and the insulative quality of a dead air space.

Thermal insulation of this type is a composite structure formed entirely of or a combination of indefinite lengths of insulating material such as paper, as for example kraft paper on asphalt impregnated paper, metal foil, as for example aluminum foil, laminated metal foil and paper, metallic coated paper, as for example, made by metallic spraying, or the like. Such material or the combination of materials are assembled in such a manner, as with glue, to form an insulating structure that is collapsible and foldable into a relatively flat shape adapted to be rolled into a compact package, and, upon use, adapted to be expanded into blanket form. In use, a particular desired length is cut or torn from the roll and one longitudinal edge or attachment flap is usually affixed, as by staples, tacks or the like, to a framing member of a building, such for example a furring strip, beam, rod, bar, stud, joist, rafter, or the like, hereinafter sometimes referred to as a stud, a transverse pull is then applied to the opposite edge or attachment flap, and this opposite edge or attachment flap is affixed to the next successive framing member. The transverse pull serves to expand the insulation into the blanket form providing a box-like structure disposed between the framing members with the edges or attachment flaps extending transversely from the box-like structure. The box-like structure is formed, in part, by spaced, substantially parallel disposed sheets of insulating material, thus providing the desirable dead air space or spaces.

The insulation of my invention is very effective against the transmission of heat by conduction, convection and radiation. Because of the bright metal reflective surface or surfaces, a high percentage, on the order of 95%, of the radiant heat is reflected. By dividing the spacing between the framing members into multiple captive air spaces, the temperature differential between successive surfaces is lowered, thus materially reducing heat transmission by convection. Due to the extremely low density of my insulating blanket, heat losses by conduction are extremely low. In addition, the bright metal, whether it be in the form of a foil or a sprayed coating provides an efficient vapor barrier preventing damage to the building from the ingress of moisture.

The majority of prior art types of insulating blankets have not fully utilized the desirable properties of the materials since they have not provided complete stud-to-stud insulation throughout the expanded depth of the blanket, but have provided portions adjacent the studs of less depth than portions spaced therefrom. This problem is further aggravated by the fact that framing members are not uniformly spaced, for example, one standard spacing is 16 inches center-to-center, yet in actual practice, the center-to-center spacing may vary from the standard. Obviously, it is not possible nor practical to provide a blanket for each and every spacing dimension.

The above-enumerated problems are successfully overcome by the thermal insulation blanket of my invention, which provides complete stud-to-stud insulation and is adaptable for the usual variations in spacing thereof while still providing the complete stud-to-stud insulation.

Therefore, the principal object of my invention is the provision of an improved light weight, expansible, foldable and rollable insulating material utilizing the reflective properties of a bright metal and the insulative qualities of dead air spaces.

Another object of my invention is the provision of an insulating material of the type described which is effective to provide complete stud-to-stud insulation throughout its width and depth or thickness.

Another and still further object of my invention is the provision of an improved insulating material of the type described which is effective to provide complete stud-to-stud insulation throughout its width and depth or thickness regardless of variances in the spacing of the framing members to which it is applied.

These and other objects and features of this invention will become apparent from the following description when taken with the accompanying drawing in which:

Figure 1 is a partial perspective view with parts broken away, of my insulating blanket in expanded form and affixed to the outer surfaces of spaced framing members;

Figure 2 is an end view of my insulating blanket in collapsed substantially folded form; and Figure 3 is a partial perspective view, similar to Figure 1 but showing a different manner of affixing my insulating blanket to framing members.

Referring now to the drawing, the insulating blanket is identified in its entirety as 10, and as illustrated in Figure 1 is in its expanded form affixed to and partially disposed between spaced framing members 11 and 12 by means such as staples 13. The blanket 10 comprises a first, a second and a third length of insulating material 14, 15 and 16, respectively, suitably secured longitudinally together adjacent their opposite edges by means of glue lines 17 and 18.

The first length of insulating material 14 provides a central front panel 19 of a width substantially equal to the spacing of the studs 11 and 12 and front portions of attachment flaps or edges 20 and 21. The second length of insulating material 15 provides a centrally disposed rear panel 22 of a width slightly greater than the spacing between the studs 11 and 12, for a purpose to be described, end walls 23 and 24 adapted to engage the framing members along their depth, as for example, the studs 11 and 12, respectively, and rear portions of the attachment flaps or edges 20 and 21 adapted to contact the framing members. Division of the material 15 into its parts is provided by means of longitudinally extending creases or folds 25, 26, 27 and 28, as illustrated. The third length of insulating material 16 provides a centrally located supporting panel 29 suitably attached to the rear panel 22 by means such as glue lines 30 and 31, intermediate stiffening members for the attachment flaps or edges 20 and 21, and intermediate walls 32 and 33. Division of the material 16 into its parts is provided by means of longitudinally extending creases or folds 34, 35, 36 and 37, as illustrated. It is to be noted that the walls 32 and 33 are disposed substantially normal to the front panel 19 and are spaced inwardly from the end walls 23 and 24, thereby allowing portions of the edge stiffening members to be coextensive with outer portions of the front panel 19. It is to be further noted that the spacing between the walls 23 and 32, and 24 and 33 may be less than that shown; however, the adjacent walls will always be spaced from each other. These latter portions of the stiffening members are affixed to the front panel 19 by means such as glue lines 38 and 39.

The intermediate length 16 and especially the walls 32 and 33 provide a means which insure the abutment of the walls 23 and 24 with the studs, since the walls 23 and 24 will be resiliently held in their proper stud engaging positions regardless of the trueness or lack of trueness of the stud along its length.

If it is desired to subdivide the blanket into two or more isolated spaces, one or more sheets of bright metal, such as sheet 40, may be attached by glue to the walls 32 and 33. The sheet or sheets 40 may be provided with suitable plaits, so that they lie substantially flat when the blanket is in its collapsed form and allow the expansion thereof upon expansion of the blanket.

In order to provide for a collapsible and foldable structure, the central front panel 19 is longitudinally folded at 41, 42, 43 and 44, so as to provide longitudinal plaits 45 and 46 which run lengthwise of the length 14 and substantially parallel to the side edges thereof. The plaits 45 and 46 are illustrated as being disposed on opposite sides of the longitudinal center of the blanket 10 and equally spaced therefrom. However, they may be provided at any location in the front panel between the glue lines 38 and 39. In addition, the plaits 45 and 46 may be oppositely formed or may be replaced by a single, larger plait (not shown).

In collapsing the structure, the folds in the second and third lengths of material 15 and 16, respectively, are so made that the material folds outwardly, i.e., the rear panel 22 and the supporting panel 29 lie flat, and the walls 23, 24 and 32, 33, respectively, are covered thereby. In the illustrated form, the folds in the front panel are so made as to fold outwardly.

As previously mentioned, the rear panel 22 is of a width slightly in excess of the standard stud spacing, so that when the blanket is installed between studs having a standard spacing, as illustrated, the rear panel will slightly bow. This provision of the rear panel, as described, insures the desirable stud-to-stud insulation even if the stud spacing is not standard. If the spacing is less than standard, the bow in the panel will become greater, but the insulation, both along the front and across the back will be continuous. If the spacing is greater than standard, the rear panel will approach a position where it is substantially parallel to the front panel 19, and the insulation, both along the front and across the back will be continuous. In both cases just described, the side walls 23, 24 will engage the studs or at least be in contact therewith at the folds 27 and 28.

To provide the necessary strength, one or the other or both of the first and second lengths of insulating material 14 and 15, respectively, may be constructed of laminated metal foil and paper or metallic coated paper, with the bright surface disposed on the exterior thereof. The third length 16 is usually constructed of paper, and the intermediate sheet or sheets 40 are of pure metal foil, since strength at this position is not required.

As previously mentioned, to install the blanket constructed according to my invention, it is only necessary to cut or tear a required length from a roll, fix one longitudinal edge or attachment flap to a stud as by stapling or the like, apply a pull to the opposite edge or attachment flap to expand the blanket, and fix the latter edge or attachment flap to the spaced stud.

The blanket of my invention can be affixed to the studs in the alternate ways illustrated in Figures 1 and 3. When the length 14 is of paper and is to be covered with lathe and plaster, plaster board or the like, the installation of Figure 1 is the easiest. If the length 14 is covered by the bright metal and the blanket is not to be covered, the installation of Figure 1 is preferable. However, when it is desired to provide an additional air space and the studs are to be covered, the blanket may be affixed in a dished-in fashion, as illustrated in Figure 3. The latter is preferable, under the above condition, when the length 14 has a bright metal surface.

The insulating blanket of my invention can be economically made because of the materials used, and, as previously explained, is very effective for its purpose. It is rollable into a tight package of relatively light weight, so that no storage problems are created, and it may be cheaply shipped to its destination. Being light weight, it is easily handled and installed.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. An indefinite lengthened thermal insulation adapted for use with spaced building framing members comprising a front panel; a rear panel; spaced attachment flaps; side walls; and an intermediate member; said front panel having a width substantially equal to the spacing between said framing members and having portions of said attachment flaps integral therewith; said rear panel having a width at least equal to the spacing between the framing members and having said side walls and portions of said attachment flaps integral therewith; said rear panel and side walls being defined by longitudinal creases, said creases being so constructed and arranged to allow said rear panel to be collapsed onto said front panel and overlying said side walls; said intermediate member having a central panel portion affixed to the rear panel and the width of said central panel portion being less than the rear panel, said intermediate member further comprising spaced wall portions connected to said central panel portion along longitudinally extending fold lines, said spaced wall portions being respectively spaced a distance from and free of contacting association with said side walls, said longitudinally extending folds being so constructed and arranged to allow said central panel portion to be collapsed onto said front panel and overlying said wall portions; said insulation being so constructed and arranged to be expanded into a substantially box-like form having said side walls in engagement with the adjacent framing members and said wall portions substantially parallel to and spaced from said side walls when in an expanded condition to thereby provide framing member-to-framing member insulation throughout its depth and width, said wall portions and said central portion serving to prevent collapse of said rear panel onto said front panel when said insulation is in its expanded form.

2. A thermal insulation as recited in claim 1 wherein at least one of said panels, attachment flaps and said side walls is constructed of paper having a bright metal reflective surface thereon.

3. A thermal insulation as recited in claim 1 wherein there is provided a second intermediate member affixed to said spaced wall portions thereby subdividing the space between said wall portions.

4. A thermal insulation as recited in claim 3 wherein said second intermediate member comprises a metal foil.

5. An indefinite lengthened thermal insulation adapted for use with spaced building framing members comprising a front panel; a rear panel; spaced attachment flaps, side walls; and an intermediate member; said front panel having a width substantially equal to the spacing between said framing members and having portions of said attachment flaps integral therewith; said rear panel having a width slightly greater than said spacing between said framing members and having said side walls and portions of said attachment flaps integral therewith; said rear panel and side walls being defined by longitudinal creases; said creases being so constructed and arranged to allow said rear panel to be collapsed onto said front panel and overlying said side walls; said intermediate member having a central panel portion affixed to the rear panel and the width of said central panel portion being less than the rear panel, said intermediate member further comprising spaced wall portions connected to said central panel portion along longitudinally extending fold lines, said spaced wall portions being respectively spaced a distance from and free of contacting association with said side walls, said longitudinally extending folds being so constructed and arranged to allow said central panel portion to be collapsed onto said front panel and overlying said wall portions; said insulation being so constructed and arranged to be rolled into a compact package and expanded into a substantially box-like form having said side walls in engagement with the adjacent framing members and said wall portions substantially parallel to and spaced from said side walls when in an expanded condition to thereby provide framing member-to-framing-member insulation throughout its depth and width, said wall portions and said central portion serving to prevent collapse of said rear panel onto said front panel when said insulation is in its expanded form.

6. A thermal insulation as recited in claim 5 wherein said front panel is provided with at least one longitudinally extending plait to assist in collapsing said insulation into a flat form for rolling said insulation into said compact package.

References Cited in the file of this patent
UNITED STATES PATENTS

| | | |
|---|---|---|
| 1,963,609 | Balduf et al. | June 19, 1934 |
| 2,101,836 | Benedict | Dec. 14, 1937 |
| 2,251,385 | Finck | Aug. 5, 1941 |
| 2,312,301 | Turner et al. | Mar. 2, 1943 |
| 2,739,703 | Giles | Mar. 27, 1956 |
| 2,749,262 | Wiser | June 5, 1956 |
| 2,750,313 | Schwartz et al. | June 12, 1956 |